(12) United States Patent
Bradley et al.

(10) Patent No.: US 9,434,391 B2
(45) Date of Patent: Sep. 6, 2016

(54) BRAKING SYSTEM

(75) Inventors: Ross Bradley, Melksham (GB); Nigel Anstey, Melksham (GB)

(73) Assignee: KNORR-BREMSE RAIL SYSTEMS (UK) LIMITED, Melksham (GB)

(*) Notice: Subject to any disclaimer, the term of this patent is extended or adjusted under 35 U.S.C. 154(b) by 195 days.

(21) Appl. No.: 14/130,973

(22) PCT Filed: Jul. 4, 2012

(86) PCT No.: PCT/GB2012/000570
§ 371 (c)(1),
(2), (4) Date: Apr. 8, 2014

(87) PCT Pub. No.: WO2013/004993
PCT Pub. Date: Jan. 10, 2013

(65) Prior Publication Data
US 2014/0257604 A1    Sep. 11, 2014

(30) Foreign Application Priority Data

Jul. 4, 2011 (GB) .................................. 1111366.9

(51) Int. Cl.
*B61C 17/00* (2006.01)
*B60T 17/22* (2006.01)
*B60T 13/66* (2006.01)

(52) U.S. Cl.
CPC .............. *B61C 17/00* (2013.01); *B60T 13/665* (2013.01); *B60T 17/228* (2013.01)

(58) Field of Classification Search
CPC ........... B61L 3/18; G05D 1/00; B61C 17/00; B60T 17/22
See application file for complete search history.

(56) References Cited

U.S. PATENT DOCUMENTS 7,850,127 B2 * 12/2010 Lemonovich ........... G06F 15/17
                                                          246/1 C
8,788,135 B2 *  7/2014 Daum ..................... B61L 3/006
                                                          701/26

FOREIGN PATENT DOCUMENTS

EP    1084925 A2       3/2001
GB    2395241 A        5/2004
JP    2002165312 A *   6/2002

OTHER PUBLICATIONS

Search Report for International Patent Application No. PCT/GB2012/000570; Nov. 21, 2012.

* cited by examiner

*Primary Examiner* — Jerrah Edwards
*Assistant Examiner* — Aaron Smith
(74) *Attorney, Agent, or Firm* — Barnes & Thornburg LLP

(57) ABSTRACT

A brake control unit for a railway vehicle having first and second cores. The first core is responsible for brake control functions and the second core is responsible for communications. A switch controls communication between the second core and a communication bus on the railway vehicle to safeguard the braking function of the first core. The second core only has write access to the communication bus when enabled by the first core, which first core determines whether the system is in a defined safe state to safeguard the braking function. This reduces the testing requirements for new communications software.

4 Claims, 2 Drawing Sheets

BRAKING SYSTEM

PRIORITY CLAIM

This patent application is a U.S. National Phase of International Patent Application No. PCT/GB2012/000570, filed 4 Jul. 2012, which claims priority to British Patent Application No. 1111366.9, filed 4 Jul. 2011, the disclosures of which are incorporated herein by reference in their entirety.

FIELD

The present disclosure relates to a braking control unit for a railway vehicle.

BACKGROUND

The current standard communications design in a railway vehicle comprises a CAN bus which enables data to be communicated along the train between devices including the brake control units.

The CAN communication protocols have proven themselves over several decades of use. It is now conventional to use standard laptop computers to operate diagnostic software and the like, which laptops can be plugged into the CAN bus and be used to communicate with the brake control units. The standard interfaces currently used in Train Management Systems (TMS) such as RS-485, MVB and FIP are regarded as being too slow by users, who want to use faster standards such as Ethernet.

Ethernet in this context describes the lower-level communications system i.e. the physical layer and simplest data packet transfer. Users require higher-level protocols to be supported that sit on top of Ethernet e.g. Profinet, CIP, TCP, UDP, Web server, maintenance.

As brake systems are safety critical, it is necessary that any executable software code that runs on the brake control unit and any modules associated with the brake control unit such as wheel slide protection is tested and validated to SIL2 (Safety Integrity Level 2). The problem that this causes is that each new module fitted to the system would need to be validated to SIL2. However, this requires several man years' work and is too expensive and time consuming for most projects.

GB 2395241 discloses a trailer brake electronic control unit. The ECU has non volatile storage memory means for storing braking related control parameters particular to the vehicle and discretely programmable storage means to carry operating data for one or more auxiliary functions of the vehicle. This is operable to check one or more incoming and outgoing variables and control algorithms against a predefined list such as to safeguard the braking function against error modes. This approach suffers from the drawback that it does not meet users' requirements for new APIs (application programming interface) to support new protocols and interface cards as the functionality in the control unit is limited.

The present disclosure provides a more flexible brake control unit arrangement.

SUMMARY

The present disclosure provides a brake control unit for a railway vehicle having first and second cores, wherein the first core is responsible for brake control functions and the second core is responsible for communications, the arrangement further comprising a switch adapted to control communication between the second core and a communication bus on the railway vehicle so as to safeguard the braking function of the first core, wherein the second core only has write access to the communication bus when enabled by the first core, which first core determines whether the system is in a defined safe state to thereby safeguard the braking function.

The main 'Control' processor provides all standard Brake Control Algorithm processing as before, but the TMS communications are moved to a second 'Communications' processor. The Communications processor is SIL0 compliant, which reduces the requirement for testing.

Moreover all communications CPU performance is provided by the Communications processor, allowing more performance for the control processor for Brake Control Algorithms.

BRIEF DESCRIPTION OF THE FIGURES

An exemplary embodiment of the invention will now be described in greater detail with reference to the drawings in which.

DETAILED DESCRIPTION

Figure 1:
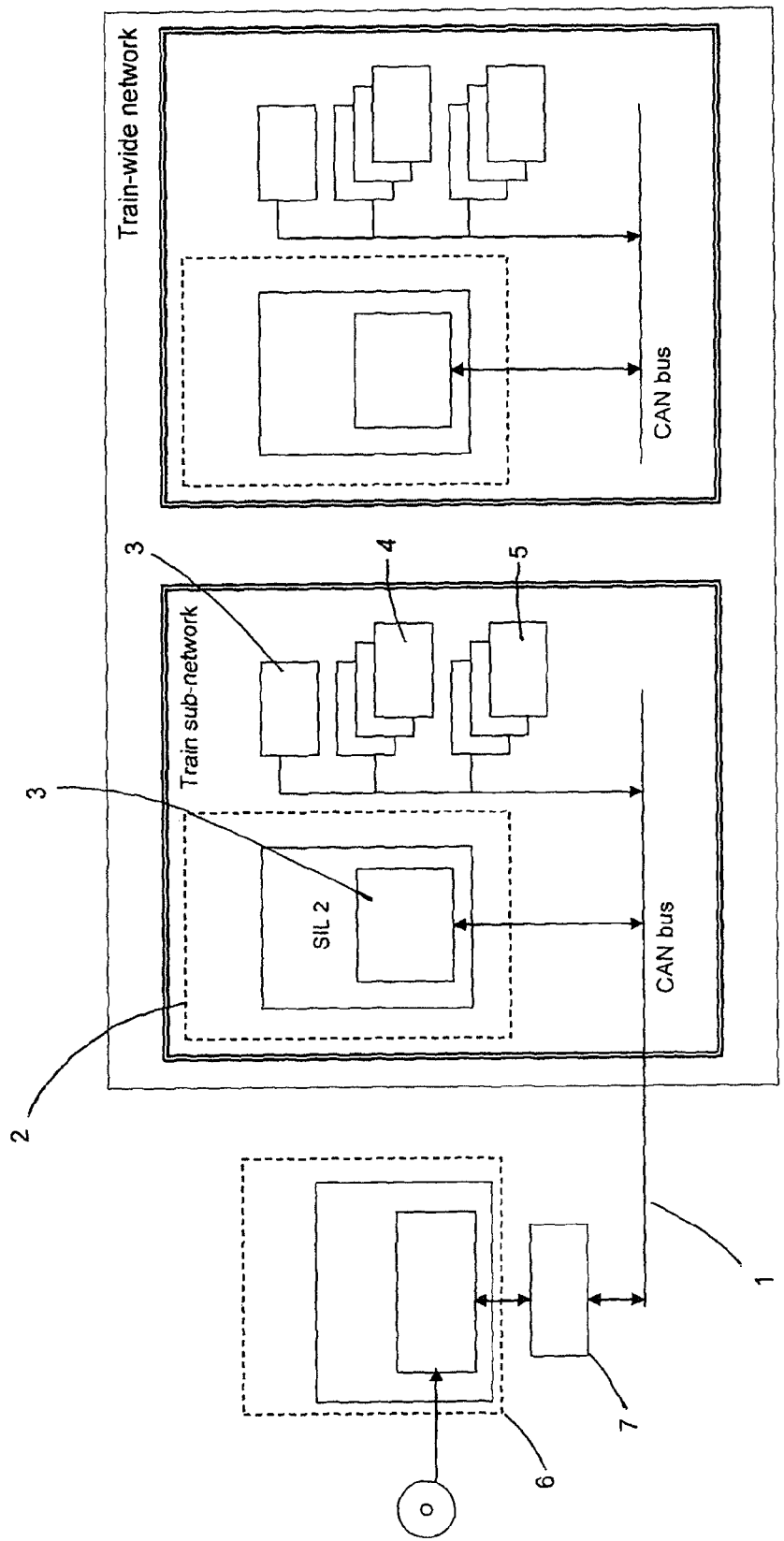
FIG. 1 shows schematically train wide network architecture.

FIG. 1 shows schematically a train wide network architecture showing a CAN bus 1. A brake control unit 2 comprising a core CPU 3 is connected to the bus 1. The brake control unit 2 may be provided with one or more modules such as the exemplary RIO (4) and RBX (5) modules, which modules are arranged in series with the brake control unit 2. The brake control unit core CPU 3 is validated to SIL 2 standard. The RIO and RBX modules must also be validated to SIL 2 standard.

A laptop 6 running standard diagnostic software is also connected to the bus 1 via a USB-CAN bus dongle 7. This arrangement allows the laptop to communicate safely with the brake control unit 2.

Figure 2:
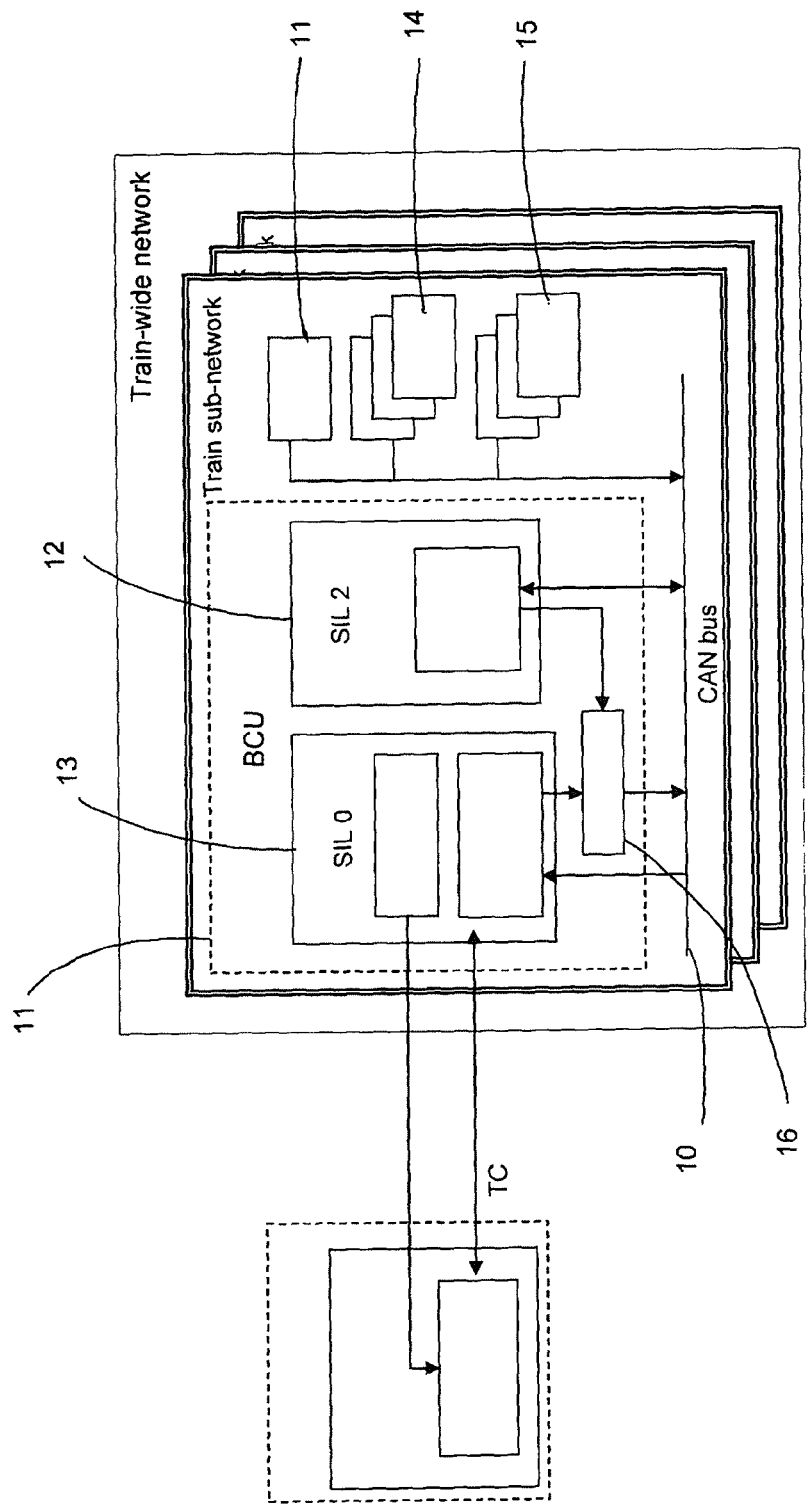
FIG. 2 shows schematically the architecture according to the present disclosure.

FIG. 2 shows schematically the architecture of the train network showing a CAN bus 10. A brake control unit 11 comprising first (12) and second cores (13) is connected to the bus 10. The brake control unit 11 may be provided with one or more modules such as the exemplary RIO (14) and RBX (15) modules, which modules are arranged in series with the brake control unit 11. The can bus 10 will typically be a dual CAN bus having a level 1 brake bus and a level 2 train bus.

The brake control unit core 12 is responsible for the braking function and is connected to the bus. The core 13 is responsible for communication functions and is connected to the bus 1 by way of a CAN switch 16, the operation of which switch 16 is controlled by the brake control unit core 12. The communication core 13 can receive data directly from the CAN bus but cannot write data to the CAN bus unless permitted to do so by the brake control unit core 12. The communication core 13 comprises a web server and enables web based applications to be installed and run on the core. The communication core 13 and any applications or software running on the core 13 need not be validated to SIL2. Typically the communications core will only write to the bus when there is a software update or maintenance to the brake system, which will require communication along the brakes layer of the bus. The communications core 13 can monitor the data on the brake databus and this can either be logged in the core or sent back to a driver. The separation of the monitoring function from the brake control function will also result in a performance enhancement to the brake core 12 as there is no extra loading. The arrangement also eases interaction with different level 2 buses.

The SIL0 processor only has write access to the Level-1 network when enabled by the SIL2 processor, which determines whether the system is in a defined 'safe state' so as to safeguard the braking function.

The bus is provided with several levels of security, with communication on level 1 being the most secure as this is used for safety critical data such as that relating to the operation of the railway vehicle brakes. The communication core 13 can receive data directly from the CAN bus but cannot write data to the CAN bus unless permitted to do so by the brake control unit core 12 when the core 12 has determined that the brake system is in a safe state. Typically such a safe state can include when the vehicle is stationary but it may include further variables such as ensuring that the emergency brake is applied or ensuring that the vehicle has been stationary for a predetermined period of time.

The invention claimed is:

1. A brake control unit for a railway vehicle comprising: first and second cores,
   wherein the first core is responsible for brake control functions and the second core is responsible for communications, the arrangement further comprising
   a switch adapted to control communication between the second core and a communication bus on the railway vehicle so as to safeguard the braking function of the first core,
   wherein the second core only has write access to the communication bus when enabled by the first core via the switch, which first core determines whether the system is in a defined safe state to thereby safeguard the braking function,
   wherein the second core can receive data from the communication bus independent of the write access enabled by the first core via the switch.

2. The brake control unit of claim 1, wherein the second core has a safety integrity level SIL0.

3. The brake control unit of claim 1, wherein the first core determines whether the system is in a defined state by determining if the vehicle is stationary.

4. The brake control unit of claim 1,
   wherein the communication bus comprises a level 1 bus and a level 2 bus,
   wherein the second core is adapted to monitor the data on the level 1 bus and either log the data in the core or send the data back to a driver via the level 2 bus.

* * * * *